ized Plant Container with Break-Away Bottom
United States Patent [19]
Gradwell et al.

[11] 4,144,672
[45] Mar. 20, 1979

[54] EXPANDED PLASTIC PLANT CONTAINER WITH BREAK-AWAY BOTTOM

[75] Inventors: John Gradwell; William Daly, both of Pretoria, South Africa

[73] Assignee: Jack Lazarus, Pretoria, South Africa

[21] Appl. No.: 766,945

[22] Filed: Feb. 9, 1977

[51] Int. Cl.² ............................................. A01G 9/10
[52] U.S. Cl. ........................................ 47/73; 47/87; 47/DIG. 7
[58] Field of Search ........................................ 47/73–78, 47/84–87, DIG. 7; 206/423

[56] References Cited
U.S. PATENT DOCUMENTS

| | | | |
|---|---|---|---|
| 3,009,291 | 11/1961 | Blackmore | 47/87 |
| 3,053,010 | 9/1962 | Shazor, Jr. | 47/DIG. 7 |
| 3,142,133 | 7/1964 | Brooks | 47/73 |
| 3,184,890 | 5/1965 | McKey | 47/73 |
| 3,667,159 | 6/1972 | Todd | 47/87 |

FOREIGN PATENT DOCUMENTS 2310696 12/1976 France ....................................... 47/73

Primary Examiner—Ronald E. Suter
Attorney, Agent, or Firm—McNenny, Pearne, Gordon, Gail, Dickinson & Schiller

[57] ABSTRACT

Open-topped container for cultivating one or more plants individually contained in a corresponding number of cavities of said container, containing a natural or artificial cultivating medium for said plant(s), e.g. soil, and being adapted for easy transplantation of such plants by said base comprising a peripheral line of weakness adapted for an application of pressure against the base cause the base to break loose from the remainder of the container. The line of weakness having an average breaking strength of between 10 and 40% of the average breaking strength of the base is preferably formed wholly or in part by elongate drainage holes passing through the base and so dimensioned that cultivating medium is retained. For transplantation the base is pushed upwards with the cultivating medium and plant.

4 Claims, 4 Drawing Figures

EXPANDED PLASTIC PLANT CONTAINER WITH BREAK-AWAY BOTTOM

BACKGROUND OF THE INVENTION

The present invention relates to a method and means for the cultivation of plants, more particularly seedlings or other plants intended for subsequent transplantation.

Seedlings are usually raised up to the stage when they are ready for transplantation into beds or fields in seedling trays or boxes of various designs. These may be made of timber or plastics. Seedlings are also sometimes raised in individual pots. This latter method is also applicable to larger plants, e.g. small trees which may also be raised up to the transplantation stage in larger individual boxes or plastics bags, tins or pots.

Difficulties arise with the removal of the frequently delicate plants or seedlings from their respective containers in which they have been raised without damage to the plant or root system. In particular it is desirable to remove the plant with as much as possible of the root system remaining embedded in the original culture medium. In the case of conventional seedling trays or boxes this is not readily achieved. It is also often difficult when the plants are to be removed from individual boxes, tins or pots, which often have to be broken up laboriously in order to facilitate transplantation without damage to the plant. When trees or the like have been raised in plastics bags, the cutting open thereof is comparatively simple and easy. However, non-rigid plastics bags suffer from other disadvantages such as lack of standing stability and/or an inclination for the bags to tear during the prolonged period of cultivation prior to transplantation and during handling.

BRIEF SUMMARY OF THE INVENTION

In accordance with the present invention there is provided an open-topped container for cultivating one or more plants in a corresponding number of cavities of said container, each adapted to contain a cultivating medium for the plants, each cavity comprising drainage hole means in the base thereof and being adapted for easy transplantation of such plants by said base comprising a peripheral line of weakness adapted for an application of pressure against the base to cause said base to break loose from the remainder of the container.

Various features which facilitate the cultivation and transplantation of plants in the aforesaid context will be described further below with reference to the accompanying drawings.

The scope of the invention also extends to the use of the container, i.e. the container whenever filled with a cultivating medium, and a plant growing in a cavity of the container thus filled.

Also in accordance with the invention there is provided a method of cultivating which comprises growing a plant to its transplantation stage in a cultivating medium contained in an individual cavity of an open-topped container, said cavity comprising one or more drainage holes through the base thereof, and said base comprising a peripheral line of weakness, applying pressure against said base, thereby to break loose the base from the remainder of the container, pushing the loose base upwards to displace the cultivating medium, including the plant from the cavity and transplanting the plant. Again, further features and details of the method will be apparent from the description further below.

DETAILED DESCRIPTION

Figure 1:
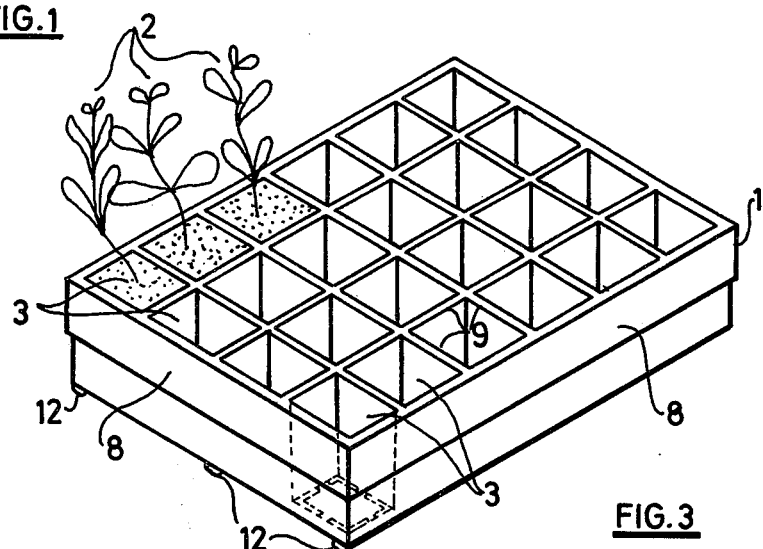
FIG. 1 represents a perspective view of a seedling tray in accordance with the invention (with seedlings)
Figure 2:
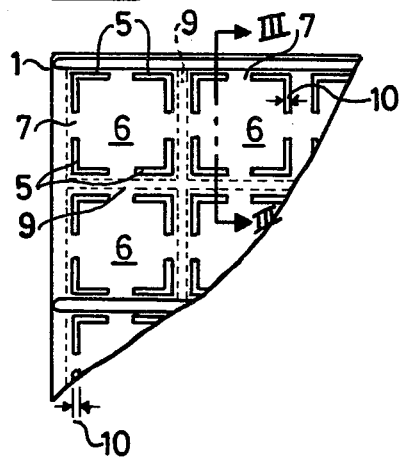
FIG. 2 represents an inverted plan view of part of a box as illustrated in FIG. 1.
Figure 3:
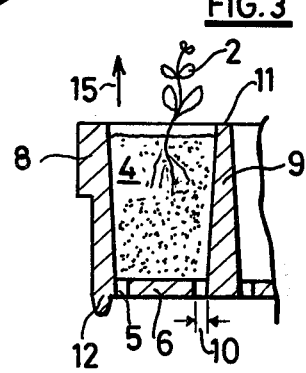
FIG. 3 represents a vertical section along line III—III in FIG. 2.

Referring to FIGS. 1 to 3 of the drawings, there is provided an open-topped container 1 for cultivating a plurality of plants, e.g. seedlings 2 raised individually, each in one of a plurality of cavities 3, each cavity containing a cultivating medium 4 for the said plants. The cultivating medium may be a conventional soil mixture as used in nurseries for the raising of the particular seedlings. Each cavity comprises one or more drainage holes, in the present example four drainage holes 5 in the base 6 of the cavity. Also, the base of each cavity comprises a peripheral line of weakness adapted for an application of pressure against the base to cause the base 6 to break loose from the remainder of the container 1. These lines of weakness may be formed by grooves (not shown) in the material joining the base to the walls of each cavity, and/or they may be formed by apertures passing right through the connecting material between the base and the walls.

In the present embodiment the lines of weakness are in fact formed entirely each by a plurality (namely four) of said drainage holes 5 in spaced apart relationship in peripheral positions in relation to the base in linear alignment with one another and separated by fracture zones 7.

The precise shape of the said peripheral outlines can be adapted to specific needs, which will then also have an influence on the shape of the holes 5. The cavities could be of circular outlines like conventional flower pots. However, angular-shaped and in particular rectangular (including square) outlines are usually preferred as in the present embodiment.

In the present embodiment the container includes side walls 8 and dividing walls 9, which latter divide the container into a plurality of said cavities 3, each being open-topped and each having its own base with said drainage holes and said peripheral line of weakness.

For the container to properly serve its intended purpose, it must on the one hand have the required strength to hold the cultivating medium and plants and allow transportation up to the time and place of transplantation. On the other hand, the line of weakness must be so designed that fracturing and coming loose of the base takes place on application of an acceptable degree of moderate pressure. The appropriate application of such pressure is desired to break loose the base from the remainder of the container without the container as a whole being fractured, so that the side and dividing walls may still support the cultivating medium in which the root system of the plants 2 is embedded. The seedling tray could be made of a variety of materials from which seedling containers are conventionally made, e.g. suitably prepared forms of fibrous material such as paper or paper-mache. Plastics are preferred, in particular those forms of expanded plastics which are sufficiently brittle to permit the easy separation of the base along the line of weakness. Expanded polystyrene is particularly preferred because of its lightness, cheapness, ease of manufacture and adequate strength.

Prolonged practical experiments have revealed certain dimensional parameters which yield satisfactory results.

The breaking strength percentages given in this specification and claims are calculated, for a particular container, by dividing the length or distance spanned by the fracture zone 7 along the line of weakness by the corresponding side length of the container base and expressing this quotient as a percentage. The average breaking strength of the base 6 is taken to be such breaking strength of the base without any line of weakness therein, for example without apertures 5.

Thus the line of weakness should have an average breaking strength of between 10 and 40%, more preferably between 20 and 35%, e.g. between 24 and 33% of the average breaking strength of the base 6 as a whole. Moreover, the strength of the fracture zone should be less than that of the walls 8, 9 to which it is attached.

However, practical experience has also shown that if the individual drainage holes are oblong (whether straight, curved or angular) they should have a width across which nowhere in plan view exceeds 4 mm, more particularly the width in plan view of each drainage hole is between 1 and 3 mm, preferably 2 mm. In this manner there is attained adequate drainage in practice, whilst loss of cultivating medium through the drainage hole is not normally problematical. The elongation of the holes coincides with the line of weakness.

The aforegoing dimensional requirements are met in a preferred embodiment as follows:

The embodiment shown has side lengths of 23 and 17 cm respectively. This rectangular area is subdivided into 4 × 6 compartments 3. The cavities taper from the top of the container towards the said peripheral outlines of the base 6. For this purpose the dividing walls of the box made of expanded polystyrene flare from a thickness of 3 mm at the top edge 11 to an average of 9 mm where the base is attached. In order to provide the drainage holes and simultaneously the line of weakness in the rectangular base of each cavity, each corner of the base 6 comprises one L-shaped drainage hole 5. The individual limbs of the L-shaped drainage hole nowhere, measured at right angles to said limbs in plan view have a width greater than 4 mm, more particularly it is 2 mm throughout. The base 6, having a thickness of 6 mm has side lengths of 25 mm and 19 mm respectively and the fracture zones 7 span a distance of 8 mm between the nearest ends of the limbs of holes 5. Accordingly, in this example the average breakage strength for the line of weakness, varies between 32% and 27½% of the average breakage strength of the base 6.

In a different example the overall dimensions of the seedling tray are the same as exemplified above. However, the tray is subdivided into 3 × 4 cavities. In this example the dividing walls are slightly stronger having a thickness of 4 mm near the top edge flaring to 10 mm in the base region. The side lengths of the base are 42 × 41 mm. The width of the drainage hole limbs is again 2 mm, but the distance spanned between adjoining limbs by the fracturing zones is 10,5 mm in each case; this corresponds to an average breaking strength of the line of weakness of between 25 and 26% of the average breaking strength of the base.

By way of further improvement the tray comprises raised regions on the base underside adapted to raise the bottom of the container from a support and to provide drainage passage means from the drainage holes beyond the confines of the container. These raised regions are provided by a plurality of downwardly directed ridges 12. More particularly, these ridges are provided parallel to one side, e.g. a long side of the container. In particular the ridges are provided along each of the two long sides of the tray, and optionally in one or more intermediate positions. Thus the tray depicted in FIG. 1 (with 24 cavities) comprises one further ridge 12 along the centre line of the tray, whereas the other example (12 cavities) has no such intermediate ridge.

Figure 4:
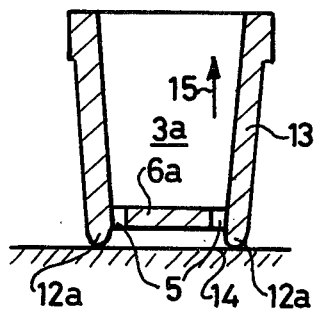
FIG. 4 represents a section similar to FIG. 3 of a different embodiment of a container in accordance with the invention, but comprising a single cavity for the cultivating of individual plants.

Referring to FIG. 4, there is provided a flower pot-like container in accordance with the invention which in contrast to FIG. 1 is not subdivided into a plurality of cavities, but comprises a single cavity 3a for a plant, e.g. a young tree. The cavity 3a tapers, being wider on top than at the base 6a. In this example the outside 13 of the container tapers similarly to permit nesting of a plurality of the containers when empty for storage.

Although the container according to FIG. 4 could be of circular cross-section, it may also be of rectangular, e.g. square cross-section. In that case the drainage holes 5 which simultaneously provide the peripheral line of weakness of the base 6a, may have the same configuration as described with reference to FIG. 1. Similarly, two sides of the underside of the container may be provided with downwardly projecting ridges 12a, whereby the base 6a is raised from a supporting surface 14 facilitating drainage of excess water.

In using the containers described with reference to the drawings, plants, e.g. seedlings or young trees are raised in the individual compartments to the transplantation stage in a conventional manner. The container is then taken to the site at which transplantation is to take place (usually with the cultivating medium in a thoroughly dampened condition). To remove a plant from the container the base 6 of the cavity containing the plant is pushed upwards, in the direction of arrow 15 with sufficient force to sever the base at the fracture zones 7. The pressure is normally applied with a finger, e.g. the thumb of one hand. Further pushing in the direction 15 causes the displacement of the plant 2 together with the cultivating medium 4, the base 6 acting in the manner of a piston. If the cultivating medium has a favourable consistency, the whole body of cultivating medium may remain intact when the plant is lifted from the container and transferred into a bed or field.

The taper of the cavities not only facilitates mould stripping during manufacture of the container, but also assists the lifting of the plant from the container. Moreover, it causes the dividing walls (FIGS. 1-3) to be strongest alongside the line of weakness, thereby helping to preserve the integrity of the dividing walls when the bottom base is pushed up. More particularly, the walls and dividing walls alongside the line of weakness are as strong or preferably stronger (thicker) than the base itself and accordingly substantially stronger than the line of weakness.

Because the fracture zones 7 are at the middle of each side of the base 6, opposite fracture zones are in closest possible proximity, which facilitates pressure transmission to these fracture zones.

What is claimed is:

1. An open-topped container made of a suitably brittle expanded plastics material for cultivating one or more plants individually contained in a corresponding number of cavities of said container containing a cultivating medium for said plant(s), each cavity comprising a base and surrounding side walls and drainage hole means through the base thereof, each cavity being constructed and arranged for easy transplantation of such plant(s) by said base including a peripheral line of weakness in the base at the intersection of the base and the respective side walls for an application of pressure against the base to cause said base to break loose from the remainder of the container, wherein the base has an average breaking strength along the line of weakness, calculated by dividing a fracture zone span length by a corresponding side length of the base, of between 20 and 35% of such average breaking strength of the base without any line of weakness therein, drainage hole means in spaced-apart relationship in peripheral positions of the base, combining to form said peripheral line of weakness, the drainage hole means comprising drainage holes each being oblong, having a width which nowhere in plan view exceeds 4 mm, the elongation coinciding with the line of weakness.

2. Container according to claim 1 wherein the width in plan view of each drainage hole is between 1 and 3 mm.

3. An open-topped container made of a suitably brittle expanded plastics material for cultivating one or more plants individually contained in a corresponding number of cavities of said container, each cavity including a base and surrounding side walls for containing a cultivating medium for said plant(s) and being intended for easy transplantation of such plant(s) by said base comprising a peripheral line of weakness in the base at the intersection of the base and respective side walls for an application of pressure upwardly against the base to cause said base to break loose from the remainder of the container, wherein each cavity has a rectangular base, each corner of the base comprising an L-shaped drainage hole, the individual limbs of which nowhere measured at right angles to such limb in plan view have a width greater than 4 mm, and wherein the limbs of adjoining holes are linearly aligned and separated by fracture zones, the base having an average breaking strength along the line of weakness which coincides with the drainage holes, said breaking strength calculated by dividing a fracture zone span length by a corresponding side length of the base, of between 20 and 35% of such average breaking strength of the base without any line of weakness therein.

4. Container according to claim 3, wherein each fracture zone is substantially in the middle of a side of the base.

* * * * *